United States Patent
Strock et al.

(10) Patent No.: US 10,626,751 B2
(45) Date of Patent: Apr. 21, 2020

(54) TURBINE COOLING AIR METERING ARRANGEMENT

(71) Applicant: United Technologies Corporation, Farmington, CT (US)

(72) Inventors: Christopher W. Strock, Kennebunk, ME (US); Paul M. Lutjen, Kennebunkport, ME (US)

(73) Assignee: United Technologies Corporation, Farmington, CT (US)

( * ) Notice: Subject to any disclaimer, the term of this patent is extended or adjusted under 35 U.S.C. 154(b) by 274 days.

(21) Appl. No.: 15/607,887

(22) Filed: May 30, 2017

(65) Prior Publication Data

US 2018/0347395 A1 Dec. 6, 2018

(51) Int. Cl.
| | |
|---|---|
| *F01D 25/12* | (2006.01) |
| *F02C 7/18* | (2006.01) |
| *F02C 7/052* | (2006.01) |
| *F02C 7/055* | (2006.01) |

(52) U.S. Cl.
CPC ............. *F01D 25/12* (2013.01); *F02C 7/052* (2013.01); *F02C 7/055* (2013.01); *F02C 7/18* (2013.01); *F05D 2260/201* (2013.01); *F05D 2260/607* (2013.01)

(58) Field of Classification Search
None
See application file for complete search history.

(56) References Cited

U.S. PATENT DOCUMENTS

| | | | | |
|---|---|---|---|---|
| 5,228,493 A | * | 7/1993 | Siemers | C22C 47/16 164/100 |
| 5,964,575 A | * | 10/1999 | Marey | F01D 25/12 415/115 |
| 6,238,183 B1 | * | 5/2001 | Williamson | F01D 5/189 416/96 A |
| 7,770,375 B2 | * | 8/2010 | Alvanos | F01D 25/32 415/121.2 |
| 8,439,639 B2 | * | 5/2013 | Joe | F01D 5/187 416/97 R |

(Continued)

FOREIGN PATENT DOCUMENTS

| | | |
|---|---|---|
| EP | 1818512 | 8/2007 |
| EP | 3015681 | 5/2016 |
| WO | 94/12775 A1 | 6/1994 |

OTHER PUBLICATIONS

Extended European Search Report for Application No. 18173674.5 dated Aug. 28, 2018.

*Primary Examiner* — David E Sosnowski
*Assistant Examiner* — Jason A Fountain
(74) *Attorney, Agent, or Firm* — Carlson, Gaskey & Olds, P.C.

(57) ABSTRACT

A cooling system for a turbine engine includes a structure defining a fluid passageway. The fluid passageway includes an impingement surface. A first opening into the fluid passageway is also included. The first opening is disposed opposite the impingement surface of the fluid passageway such that airflow entering the fluid passageway impacts the impingement surface. An agglomerate retention structure is disposed on the impingement surface. The agglomerate retention structure holds particulates impacting the impingement surface entering through the opening. A turbine engine is also disclosed.

16 Claims, 5 Drawing Sheets

(56) References Cited

U.S. PATENT DOCUMENTS

| | | | | |
|---|---|---|---|---|
| 8,943,791 B2* | 2/2015 | Tibbott | F01D 25/32 | 415/115 |
| 9,145,779 B2 | 9/2015 | Joe et al. | | |
| 10,323,573 B2* | 6/2019 | Lutjen | F01D 11/12 | |
| 2007/0183887 A1* | 8/2007 | Alvanos | F01D 25/32 | 415/121.2 |
| 2009/0214329 A1* | 8/2009 | Joe | F01D 5/187 | 415/121.2 |
| 2011/0067378 A1* | 3/2011 | Tibbott | F01D 25/32 | 60/39.091 |
| 2013/0192257 A1* | 8/2013 | Horine | F01D 11/08 | 60/796 |
| 2016/0032835 A1* | 2/2016 | Lutjen | F01D 11/12 | 60/39.092 |

\* cited by examiner

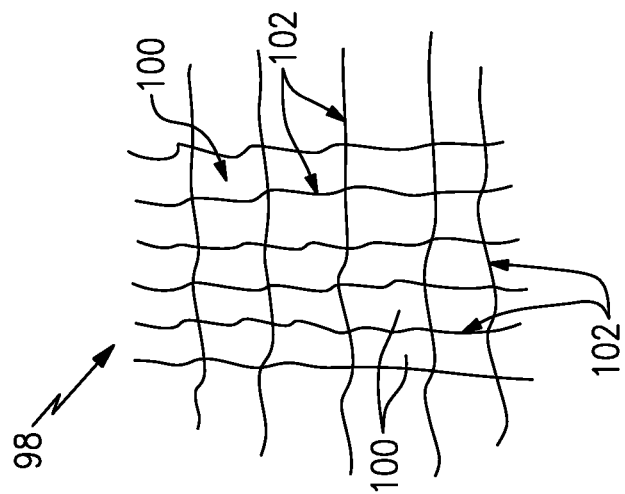
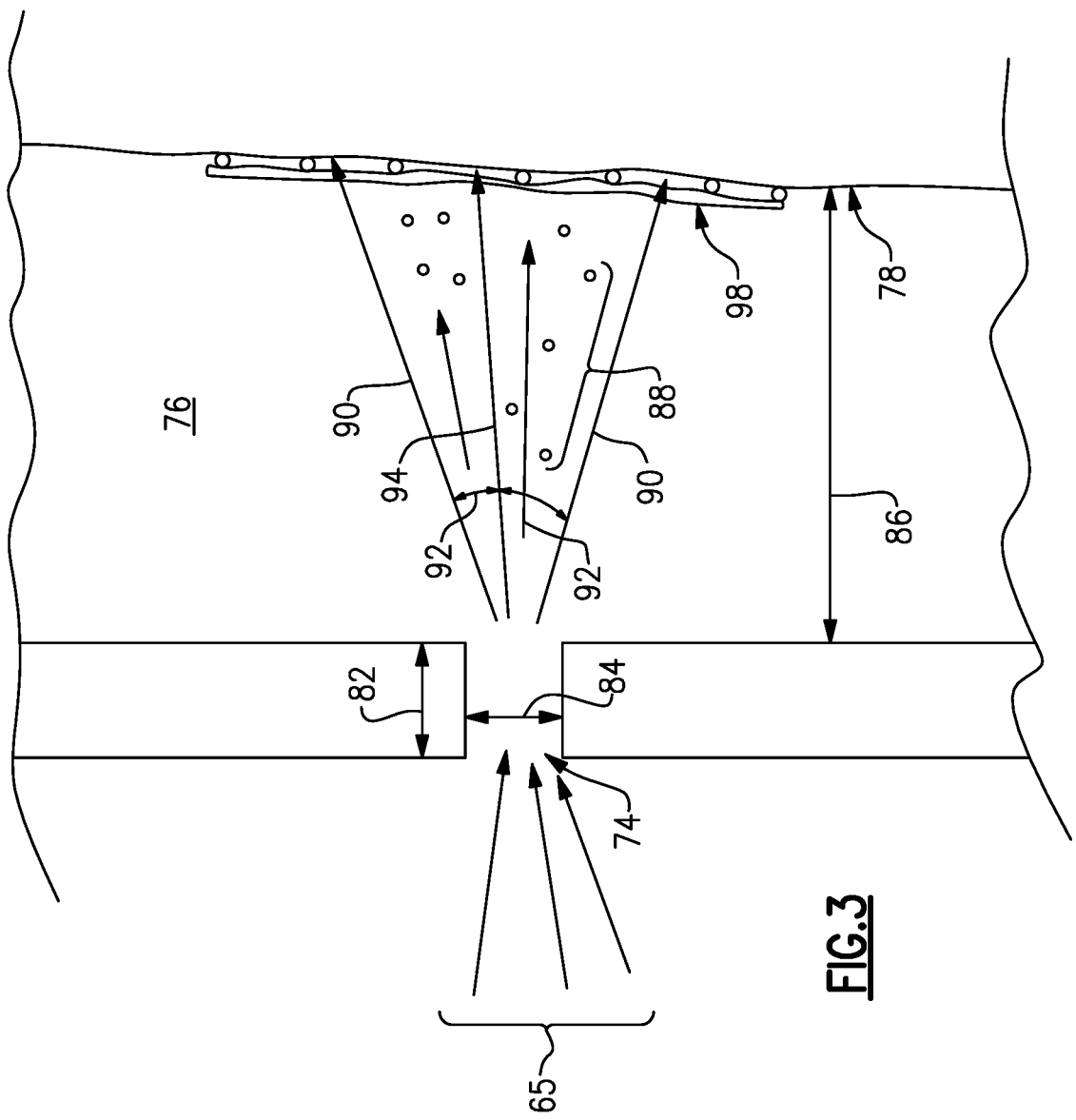

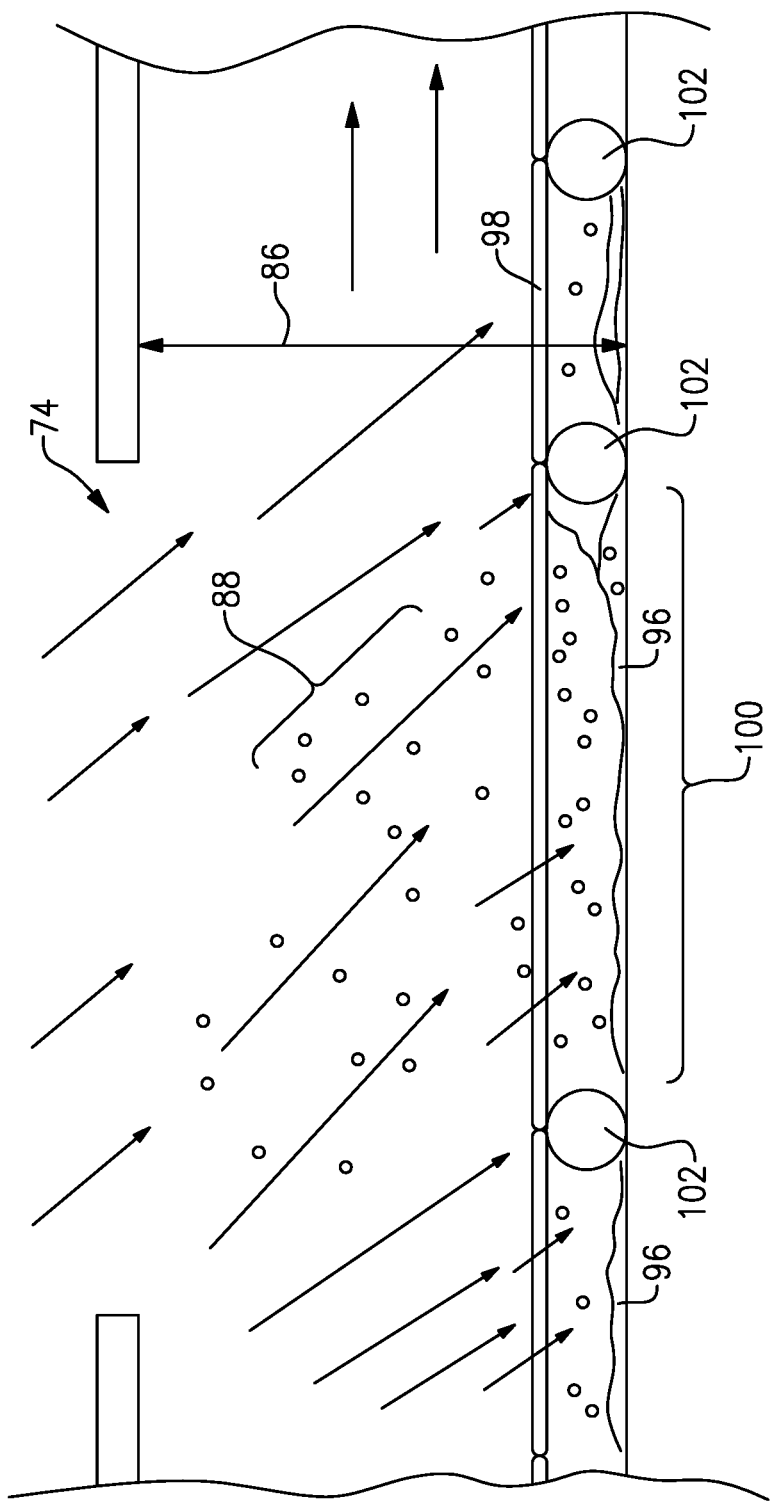

ized from the outside environment or that are worn away from abradable coatings within the fan and compressor sections. Particles within the cooling system may build in locations where cooling air impinges on surfaces and passage walls. The smaller particles build up on surfaces and accumulate into larger pieces. The accumulated particles may break free in pieces large enough to block and restrict cooling flow through smaller cooling openings that may degrade cooling performance.

TURBINE COOLING AIR METERING ARRANGEMENT

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Cooling air is drawn from the compressor section and used to generate a cooling air flow within portions of the turbine section. Cooling air flow may include particles ingested from the outside environment or that are worn away from abradable coatings within the fan and compressor sections. Particles within the cooling system may build in locations where cooling air impinges on surfaces and passage walls. The smaller particles build up on surfaces and accumulate into larger pieces. The accumulated particles may break free in pieces large enough to block and restrict cooling flow through smaller cooling openings that may degrade cooling performance.

Turbine engine manufacturers continue to seek further improvements to engine performance and durability including improvements to thermal, transfer and propulsive efficiencies.

SUMMARY

In a featured embodiment, a cooling system for a turbine engine includes a structure defining a fluid passageway. The fluid passageway includes an impingement surface. A first opening into the fluid passageway is also included. The first opening is disposed opposite the impingement surface of the fluid passageway such that airflow entering the fluid passageway impacts the impingement surface. An agglomerate retention structure is disposed on the impingement surface. The agglomerate retention structure holds particulates impacting the impingement surface entering through the opening.

In another embodiment according to the previous embodiment, the first opening includes a first diameter, and a distance between the first opening and the impingement surface is between 3 and 20 times the first diameter.

In another embodiment according to any of the previous embodiments, an impingement angle of airflow between the first opening and the impingement surface is less than about 45 degrees.

In another embodiment according to any of the previous embodiments, the first opening includes a metering hole having an aspect ratio greater than about one.

In another embodiment according to any of the previous embodiments, the agglomerate retention structure includes a mesh attached to the impingement surface.

In another embodiment according to any of the previous embodiments, the mesh includes an open area less than an area of the first opening.

In another embodiment according to any of the previous embodiments, the mesh includes an open area less than about one fourth an area of the first opening.

In another embodiment according to any of the previous embodiments, the agglomerate retention structure is integral to the impingement surface.

In another embodiment according to any of the previous embodiments, the agglomerate retention structure includes at least one of a rib and pedestal extending upward from the impingement surface.

In another embodiment according to any of the previous embodiments, the agglomerate retention structure includes a surface coating providing a roughness greater than surrounding areas of the impingement surface.

In another embodiment according to any of the previous embodiments, the impingement surface and the agglomerate retention structure are upstream of at least one hole with an opening diameter less than the first diameter.

In another featured embodiment, a turbine engine includes a compressor section. A combustor is in fluid communication with the compressor section. The combustor generates a high-temperature gas flow. A turbine section is in fluid communication with the combustor. The turbine section includes at least one component exposed to the high temperature gas flow. A fluid passageway receives airflow from the compression section. The fluid passageway includes an impingement surface and a first opening into the fluid passageway. The first opening is disposed opposite the impingement surface of the fluid passageway such that airflow impacts the impingement surface and an agglomerate retention structure holds particulates that impact the impingement surface.

In another embodiment according to any of the previous embodiments, the impingement surface and agglomerate retention structure are disposed on a surface of the at least one component not exposed to the high-temperature gas flow.

In another embodiment according to any of the previous embodiments, the at least one component includes one of a blade outer air seal and vane support structure.

In another embodiment according to any of the previous embodiments, the impingement surface and the agglomerate retention structure are upstream of at least one cooling hole with an opening diameter less than the first diameter.

In another embodiment according to any of the previous embodiments, the first opening includes a first diameter, and a distance between the first opening and the impingement surface is between 3 and 20 times the first diameter.

In another embodiment according to any of the previous embodiments, an impingement angle of airflow between the first opening and the impingement surface is less than about 45 degrees.

In another embodiment according to any of the previous embodiments, the first opening includes a metering hole having an aspect ratio greater than about one.

In another embodiment according to any of the previous embodiments, the agglomerate retention structure includes a mesh attached to the impingement surface.

In another embodiment according to any of the previous embodiments, the agglomerate retention structure is integral to the impingement surface.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is a schematic representation of an example metering hole and retention structure embodiment.

FIG. 4 is a schematic representation of an example retention structure embodiment.

FIG. 5 is an enlarged schematic view of the example retention structure embodiment.

DETAILED DESCRIPTION

Figure 1:
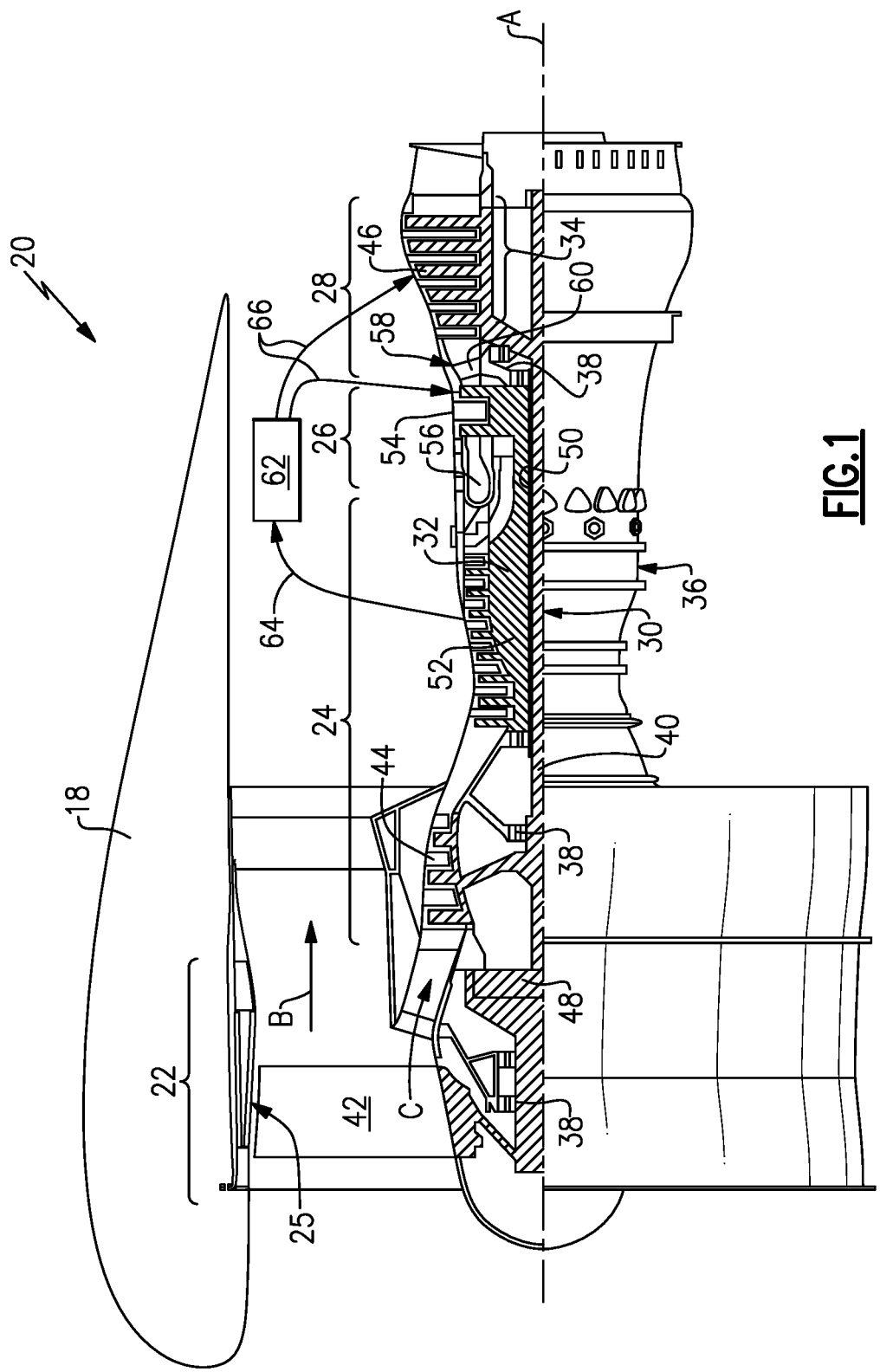
FIG. 1 is a schematic view of an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 18, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The high combustion temperatures of the high-energy gas flow that expands through the turbine section 28 present a challenge for material and structural features. Accordingly, a cooling air system 62 is provided to generate cooling air flow along surfaces exposed to the high temperature gas flow. The cooling system 62 taps relatively cooler air, schematically indicated at 64, from the compressor section 24 and directs that cooler air through passages schematically indicated at 66 into locations within the turbine section 28. Any ingested debris may be directed through the cooling system 62 and into the passages 66. Moreover, particles that wear away from abradable surfaces 25, such as those proximate the fan 42 may also be communicated through the cooling system 62 into the passages 66.

Figure 2:
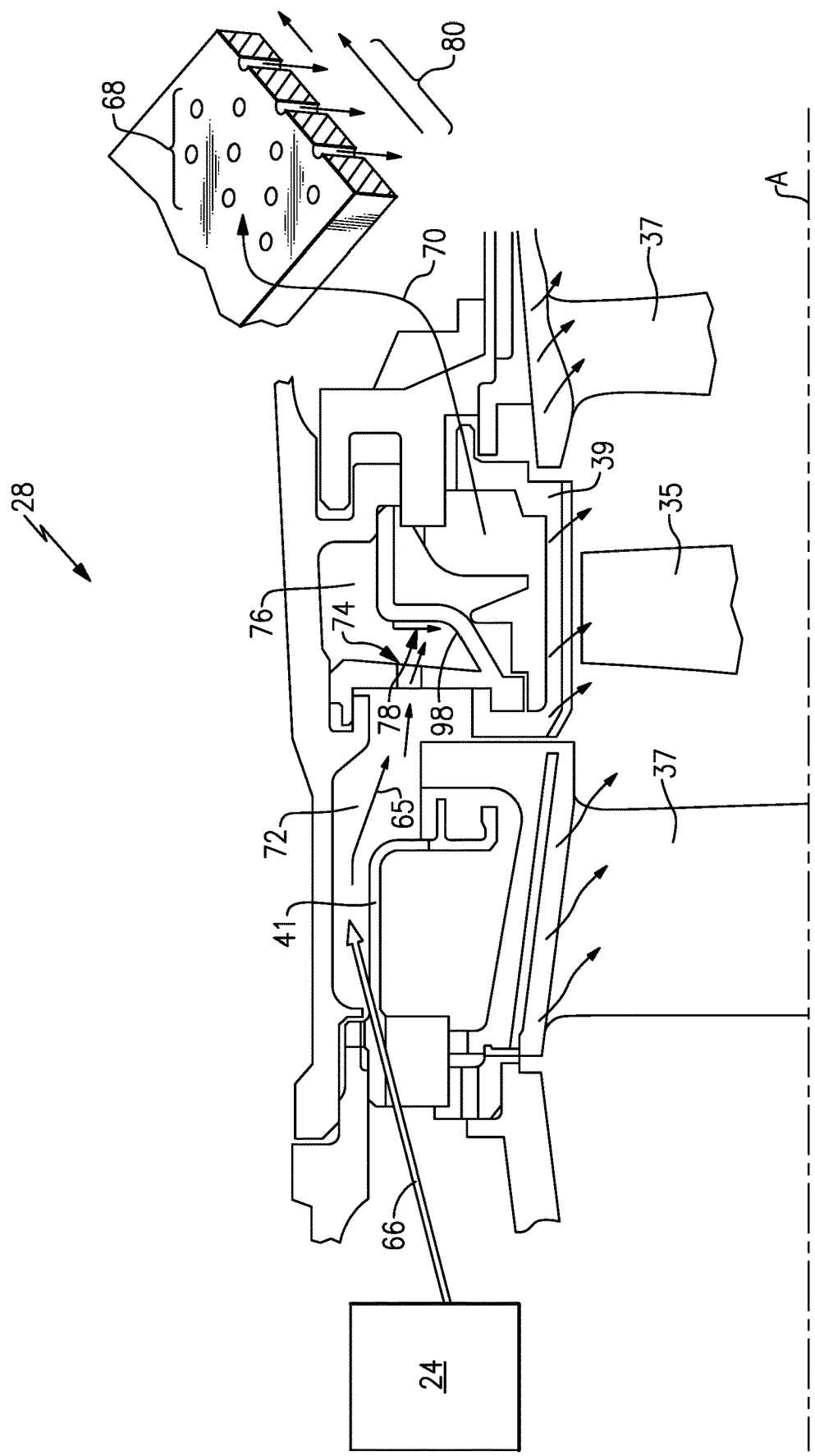
FIG. 2 is an enlarged schematic view of a turbine portion of the example turbine engine.

FIG. 2 with continued reference to FIG. 1, a schematic view of a portion of the turbine section 28 is shown and includes rotating turbine blades 35 and fixed turbine vanes 37. A vane support structure 41 supports each vane 37. The turbine blades 35 rotate proximate a blade outer air seal (BOAS) 39. Cooling airflow 65 is provided by the compressor section 24 through a plurality of conduits and passages schematically indicated at 66. This cooling airflow 65 is communicated through a supply passage 72 and then through a series of metering openings 74 into other passages that distribute cooling air through the turbine section 28.

FIG. 2 illustrates a single metering opening 74, however a plurality of metering openings 74 would be distributed circumferentially within structures within the turbine section 28. The metering opening 74 communicates cooling air to a passage 76. Cooling air that flows through the metering opening 74 impinges on an impingement surface 78 disposed across from the metering opening 74. The cooling air is further communicated through additional passages and conduits schematically indicated at 70 to smaller film cooling air openings 68 that generate the desired cooling air flow schematically indicated at 80. In the disclosed example embodiment, the metering opening 74 is shown within the supporting structure for the BOAS 39, however, it also within the contemplation of this disclosure that the metering opening 74 may be within the vane support structure 41, or any other structure through which cooling air flows.

Because the cooling airflow from the compressor section 24 may include particulates accumulated from the outside environment and also from structures within the engine such as the abradable surfaces 25 within the fan section 22, particulates may end up within the cooling system and the various cooling passages that lead to the film cooling holes 68. As appreciated, excessive amounts of particulates can cause blockages that disrupt and reduce the efficiency of the cooling air system. While the complete elimination of particulates with the engine would be preferable, it is not a practical solution and therefore the example cooling air system 62 includes features that accommodate particulates and prevent them from flowing into areas that would degrade cooling system operation.

In this example, the impingement surface 78 includes an agglomerate retention structure 98 that holds particulates in place so that they do not move downstream to smaller cooling passages and openings.

Referring to FIGS. 3 and 4 with continued reference to FIG. 2, the example metering opening 74 supplies air to the passage 76. The passage 76 includes the impingement surface 78 on which cooling air entering through the metering opening 74 impinges. The impingement surface 78 is disposed across from each of the metering openings 74 and includes the agglomerate retention structure 98 that traps and maintains particulates 88 within the passage 76. In this example, the agglomerate retention structure 98 is a wire mesh through which the particulates 88 flow, accumulate and become trapped.

Accumulation of particulates 88 is facilitated by a disclosed relationship between the size of the metering opening 74, distance and orientation of the impingement surface 78 relative to the metering opening and positioning of the agglomerate retention structure 98. The relationship of these elements generates a desired deposition of particulates 88 in a designated region and prevents dislodgement of larger accumulated pieces.

In this example, the metering opening 74 has an aspect ratio that is greater than one (1). The aspect ratio is a relationship between the thickness 82 and the opening diameter 84. The impingement surface 78 is spaced a distance 86 from the opening 74. In one disclosed example, the distance 86 is between three (3) and twenty (20) times the diameter 84 of the metering opening 74. In a further example embodiment, the distance 86 is between five (5) to ten (10) times the diameter 84 of the metering opening 74.

An example impingement angle 92 of cooling airflow 90 against the impingement surface 78 is no more than 45 degrees from an impingement airflow indicated at 94 that is normal to the opening 74. In FIG. 3, the angles 92 are shown relative to the normal cooling airflow 94. The angles 92 define an area on the impingement surface 78 that is disposed within a region defined between airflows 90 disposed at 45 degree angles about the normal airflow indicated at 94. As appreciated, FIG. 3 is a two-dimensional representation and the area for impingement would be within an area defined circumferentially about the normal airflow 94.

Referring to FIG. 4 with continued reference to FIG. 3, a schematic view of the agglomerate retention structure 98 is illustrated and comprises a mesh structure with areas 100 between strands of mesh material 102. The mesh agglomerate retention structure 98 is attached to the impingement surface 78 by welding, brazing or other known attachment process. In this example the mesh agglomerate retention structure 98 comprises metal including material properties compatible with the high temperature environment with the turbine section 28. The agglomerate retention structure 98 may also be fabricated from other materials compatible with the turbine section environment.

Referring to FIG. 5 with continued reference to FIGS. 3 and 4, the mesh agglomerate retention structure 98 includes the areas 100 that enable particulate matter 88 to pass through and contact the impingement surface 78. In the disclosed example embodiment, the areas 100 are of the individual openings between the mesh material 102. Once within the mesh agglomerate retention structure 98 the particles will accumulate and become trapped in place. The areas 100 are selected in view of the expected particle size, size of the opening 74 and impingement area. In one disclosed embodiment, the areas 100 are each less than the diameter 84 of the opening 74. In another disclosed embodiment, the areas 100 are each less than about one fourth the diameter 84 of the opening.

The mesh agglomerate retention structure 98 provides a location for the particulates 88 to become trapped and be retained so that parts of the accumulated particulates 88 are not communicated downstream to other more sensitive locations. The particulate matter 88 is agglomerated into a layer of larger pieces indicated at 96 that are intertwined and trapped within the mesh agglomerate structure 98. Once within the mesh agglomerate retention structure 98, the particulates 88 and larger pieces 96 adhere both with surfaces of the wire material 96 and the impingement surface 78 and remain in place rather than moving downstream.

Figure 7:
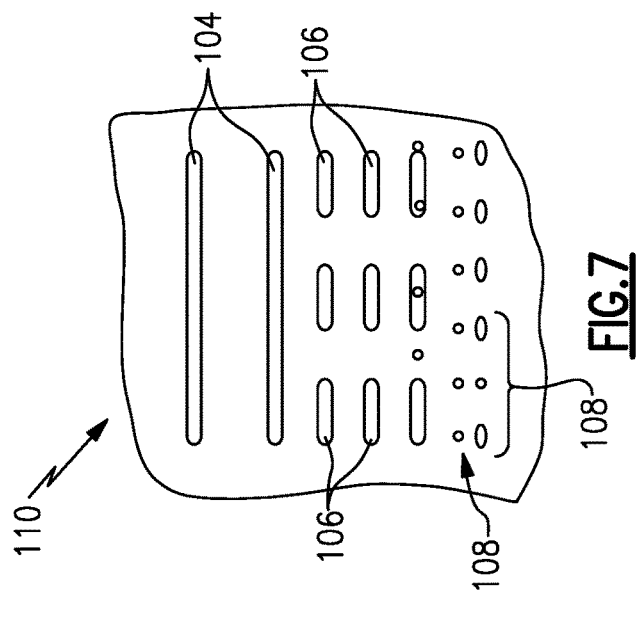
FIG. 7 is a top view of the example retention structure embodiment shown in FIG. 6.
Figure 6:
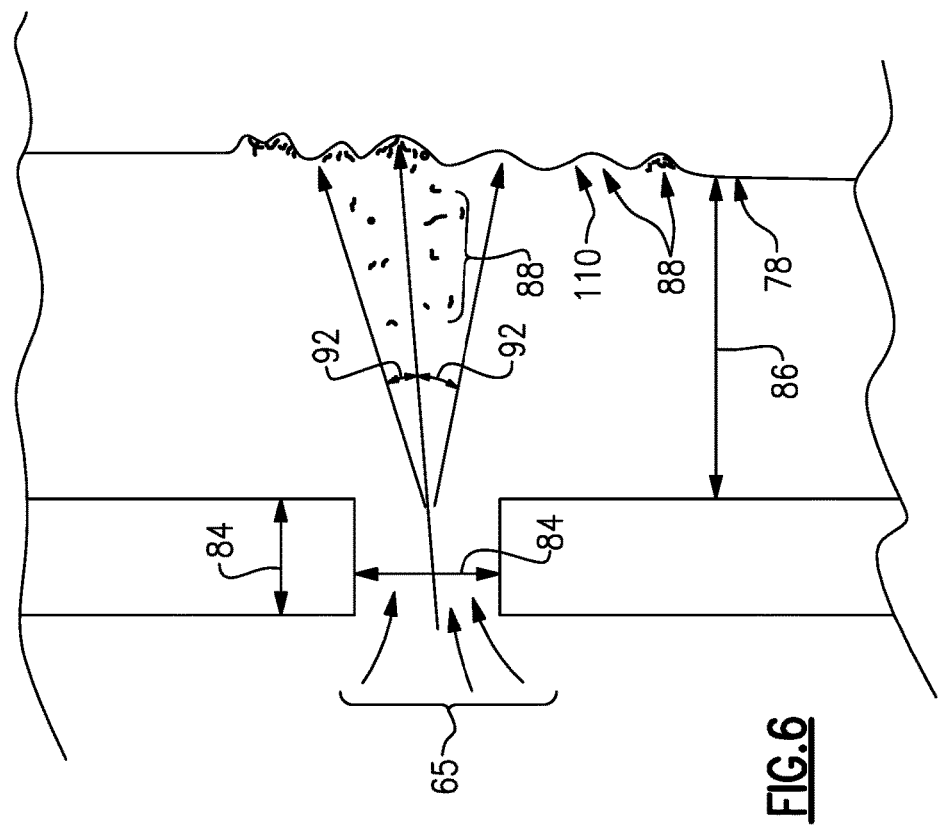
FIG. 6 is a schematic view of another example retention structure embodiment.

Referring to FIGS. 6 and 7, another agglomerate retention structure is schematically illustrated at 110 and includes integral features formed within the impingement surface 78. In this example, the agglomerate retention structure 110 includes raised features between depressions that provide an area for accumulation and trapping of particulates 88.

In the disclosed example, the integral agglomerate retention structure 110 may include ribs 104 that extend substantially the entire length of the accumulation area. The agglomerate retention structure 110 may also include shorter spaced apart ribs 106 or a plurality of pedestals 108 that extend outward from the impingement surface 78. It should be appreciated, that other structures and shapes are within the contemplation of this disclosure. The ribs 104, 106 and pedestals 108 within the agglomerate retention structure 110 encourage the accumulation of the particulates 88 and intertwine with the amassed particulates to hold them in place to prevent flaking off and movement downstream into the more sensitive and smaller film cooling holes, passages and openings.

Figure 8:
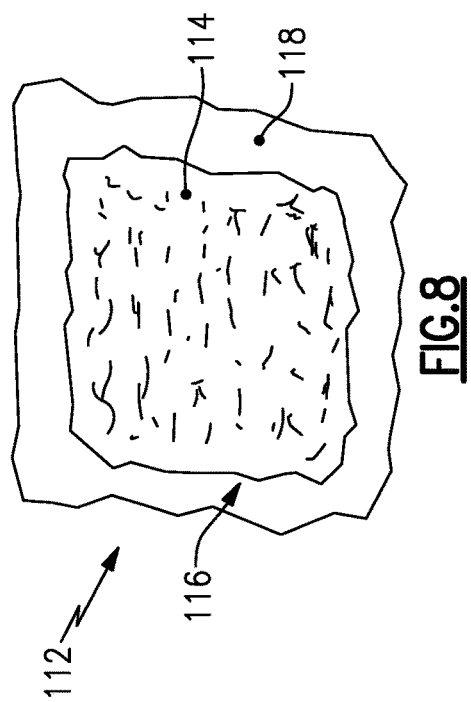
FIG. 8 is a top view of another example retention structure embodiment.

Referring to FIG. 8, another disclosed example agglomerate retention structure is generally indicated at 112 and is formed as a coating 114 deposited on impingement surface 116. The coating 114 forms an area rougher than the surrounding area 118 of the impingement surface 116. The coating 114 provides a surface that enables retention of particulates 88 deposited on the impingement surface 116 by encouraging accumulation and particles with the coating 114.

Accordingly, the example cooling air system includes features for maintaining particles within a defined area to maintain open cooling air passages and openings within the turbine section.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A cooling system for a turbine engine comprising:
   a structure defining a fluid passageway, the fluid passageway including an impingement surface;
   a first opening into the fluid passageway, wherein the first opening is disposed opposite the impingement surface of the fluid passageway such that airflow entering the fluid passageway impacts the impingement surface and the impingement surface is normal to the airflow entering the fluid passageway; and
   an agglomerate retention structure disposed on the impingement surface, the agglomerate retention structure comprising at least one rib that extends a length of the impingement surface for holding particulates impacting the impingement surface entering through the opening.

2. The cooling system as recited in claim 1, wherein the first opening comprises a first diameter, and a distance between the first opening and the impingement surface is between 3 and 20 times the first diameter.

3. The cooling system as recited in claim 1, wherein an impingement angle of airflow between the first opening and the impingement surface is less than about 45 degrees, about either side of the normal airflow through the opening and the length of the impingement surface transverse to the normal airflow is greater than or equal to a span of the airflow defined by the 45 degree angle about either side of the normal airflow.

4. The cooling system as recited in claim 1, wherein the first opening comprises a metering hole having an aspect ratio greater than about one.

5. The cooling system as recited in claim 1, wherein the agglomerate retention structure is integral to the impingement surface.

6. The cooling system as recited in claim 5, wherein the agglomerate retention structure further includes at least one pedestal extending upward from the impingement surface.

7. The cooling system as recited in claim 1, wherein the agglomerate retention structure comprises a surface coating providing a roughness greater than surrounding areas of the impingement surface.

8. The cooling system as recited in claim 1, wherein the impingement surface and the agglomerate retention structure are upstream of at least one hole with an opening diameter less than the first diameter.

9. A turbine engine comprising:
   a compressor section;
   a combustor in fluid communication with the compressor section, the combustor generating a high-temperature gas flow;
   a turbine section in fluid communication with the combustor, the turbine section including at least one component exposed to the high temperature gas flow; and
   a fluid passageway receiving airflow from the compression section, the fluid passageway including an impingement surface and a first opening into the fluid passageway, wherein the impingement surface is normal to an airflow through the first opening,
   wherein the first opening is disposed opposite the impingement surface of the fluid passageway such that airflow impacts the impingement surface and an agglomerate retention structure holds particulates that impact the impingement surface, wherein the agglomerate retention structure comprises at plurality ribs that are integral to the impingement surface and extend an entire length of the impingement surface.

10. The turbine engine as recited in claim 9, wherein the impingement surface and agglomerate retention structure are disposed on a surface of the at least one component not exposed to the high-temperature gas flow.

11. The turbine engine as recited in claim 10, wherein the at least one component comprises one of a blade outer air seal and vane support structure.

12. The turbine engine as recited in claim 9, wherein the impingement surface and the agglomerate retention structure are upstream of at least one cooling hole with an opening diameter less than the first diameter.

13. The turbine engine as recited in claim 9, wherein the first opening comprises a first diameter, and a distance between the first opening and the impingement surface is between 3 and 20 times the first diameter.

14. The turbine engine as recited in claim 9, wherein an impingement angle of airflow between the first opening and the impingement surface is less than about 45 degrees about either side of the normal airflow through the opening and the length of the impingement surface transverse to the normal airflow is greater than or equal to a span of the airflow defined by the 45 degree angle about either side of the normal airflow.

15. The turbine engine as recited in claim 9, wherein the first opening comprises a metering hole having an aspect ratio greater than about one.

16. The turbine engine as recited in claim 9, wherein the agglomerate retention structure is integral to the impingement surface.

\* \* \* \* \*